United States Patent [19]
McKinney

[11] Patent Number: 6,036,471
[45] Date of Patent: Mar. 14, 2000

[54] DUAL PORTABLE HIGH EFFICIENCY RAPID PROCESS MASS PRODUCTION INJECTION MOLDS

[75] Inventor: Craig B. McKinney, 145 So. Minnesota Ave., Glendora, Calif. 91741

[73] Assignee: Craig B. McKinney, Glendora, Calif.

[21] Appl. No.: 09/130,543

[22] Filed: Aug. 6, 1998

Related U.S. Application Data

[63] Continuation-in-part of application No. 08/675,243, Jul. 2, 1996, Pat. No. 5,799,462.

[51] Int. Cl.[7] .............................. B29C 45/00; B29C 45/64
[52] U.S. Cl. ............................................... 425/542; 249/79
[58] Field of Search ................................ 249/79, 80, 134; 425/542

[56] References Cited

U.S. PATENT DOCUMENTS

| | | |
|---|---|---|
| 3,690,800 | 9/1972 | Schwab . |
| 3,707,342 | 12/1972 | Lohmann . |
| 3,892,115 | 7/1975 | Mees . |
| 4,192,638 | 3/1980 | Lezier et al. ............................ 249/79 |
| 4,241,555 | 12/1980 | Dickins . |
| 4,284,447 | 8/1981 | Dickins . |
| 4,315,887 | 2/1982 | Kubat . |
| 4,342,717 | 8/1982 | Gardner . |
| 4,408,981 | 10/1983 | Brown . |
| 4,565,723 | 1/1986 | Hirsch . |
| 4,872,827 | 10/1989 | Noda ......................................... 249/79 |
| 5,052,915 | 10/1991 | Schad . |
| 5,055,250 | 10/1991 | Schad . |
| 5,145,353 | 9/1992 | Zakich . |
| 5,156,754 | 10/1992 | Nomura et al. ......................... 249/134 |
| 5,249,951 | 10/1993 | Leonhartsberger . |
| 5,454,709 | 10/1995 | Leonhartsberger . |
| 5,653,907 | 8/1997 | Kendell et al. ........................... 249/79 |
| 5,725,891 | 3/1998 | Reid, Jr. .................................... 249/79 |

*Primary Examiner*—Tim Heitbrink
*Attorney, Agent, or Firm*—Craig B. McKinney

[57] ABSTRACT

A duality of portable, lightweight, rapid process and highly efficient injection molds for the mass production of structural insulated polystyrene building panel systems. The non metallic and non conductive molds and mobile supporting base platform are impervious to drastic degrees and fluctuations of positive or negative air, moisture and temperatures. A complete production run per mold is accomplished in approximately 1 minute while absent all time, labor, energy, materials and costs for pre heat cycles as well as all time, labor, energy, materials and costs for cycles of massive amounts of cooling fluids while rapidly self cooled by negative air. The molds can operate simultaneously or alternately while supported by common material feed hopper, air, hydraulic unit and steam/heat supply reservoir.

4 Claims, 6 Drawing Sheets

DUAL PORTABLE HIGH EFFICIENCY RAPID PROCESS MASS PRODUCTION INJECTION MOLDS

This is a Continuation In Part of application Ser. No. 08/675,243 filed Jul. 2, 1996, now U.S. Pat. No. 5,799,462.

BACKGROUND OF INVENTION

There have been developed a variety and types of injection molds for processing in-fill plastic core materials such as expandable polystyrene (EPS) and the like. All have been constructed mainly of heavy steel and large dimensional quantities of aluminum. All current predecessors have five cycles for manufacturing. The first cycle and of utmost in the current processes is pre-heating the mold and the internal walls of the steam/heat distribution chambers by purging with steam. Second is the injection of pre-expanded in-fill core material (EPS) or the like into the part chamber or mold cavity. Third cycle is pressure induction of the expansion agent of steam/heat for the second time into the steam/heat distribution chambers which is then forced through a screened material into the mold cavity for the second and final expansion of the in-fill core material thereby molding the desired part. The forth cycle, also of utmost importance is the cooling of the mold and the internal steam/heat distribution chambers and the structural wall materials in general. The importance of this cycle is critical because the part, once extracted from the press/mold part cavity, will have what is commonly known as post expansion. To preclude this from happening, the entire press/mold assembly must be lowered or cooled to a comfortable temperature range prior to extraction so as to preclude post expansion of the part. This is accomplished by current processing art with a massive flushing of the internal surfaces of the press/mold with large quantities of cold water for a given time frame or until the entire press assembly is cooled enough for the extraction of the desired part. The now instant invention accomplishes the entire full process without the need for consumption of high volumes of time and high heat ranges for a pre-heat cycle nor the need for massive amounts of cold water and the time needed for the cooling cycle mandatory in today's current processing art. The fifth cycle of the current processes would be the extraction of the manufactured part from the injection mold while the part remains dimensionally stable.

PRIOR ART

The industry today touts and has rather anticipating dreams of completing the entire process at the rate of twenty per hour or a three minute production run per part for a large block or building panel. Although impressive, they are limited to one part (block or building panel) per process by size and weight limitations of the press/mold being constructed with materials that are weight laden while also subject to tremendous thermal transference thereby drawing and consuming valuable time, steam/heat, coolants and energy during the full operational process. Direct attention had never been made to the materials used to construct the injection mold that directly affect the time and energy consumed in processing. The energy and time consumed for that processing together with the number of cycles involved for the completed process sequences for the desired parts is cumbersome, costly and an unnecessary waste of time and energy.

The present invention is a direct assault on the consumption of processing time, energy, materials and the number of processing cycles needed for a production run as well as the quantity of parts completed per production run of structural building panels or blocks. The now invention accomplishes the entire full process without the wasted consumption of time and wasted heat ranges for the pre heat cycle nor the wasted consumption of time and cold water purging for a cooling cycle. Additionally, enormous size coupled with the portability of the press/molds is acquired by dramatic weight reductions through the use of composite structural materials.

SUMMARY OF INVENTION

It is the now present invention wherein the dual portable rapid process high efficiency machinery for mass production of composite structural building panels or blocks eliminates the pre heat and cool down cycles during the expansion molding process of expandable polystyrene (EPS) or the like. In addition to the markedly less consumption of energy, processing materials and time, the now invention eliminates any size and weight limitations of the press/mold assemblies that would hinder and preclude design efforts of the production machinery. The current invention allows the fabrication of an injection press/mold to be sixty feet long, twelve feet tall while sistered with another mirrored press/mold mounted parallel and adjacent to each other. Both sets of dual press/molds are constructed of lightweight composite materials impervious to corrosion and thermal transference while each is mounted perpendicular to a common lightweight mobile base for road transfer. The dual press/molds can be operated simultaneously or alternately while supported by common electronic control unit, material feed hopper, hydraulic unit, positive or negative air pressures. The production rate of the new expansion mold invention compared to all prior art when considering panels or blocks is increased at least by a conservative 40 to 1 ratio.

BRIEF DESCRIPTION OF FIGURES

The present invention is illustrated with respect to particular preferred embodiments thereof in the accompanying drawings, wherein.

DESCRIPTION OF PREFERRED EMBODIMENTS

Figure 1:
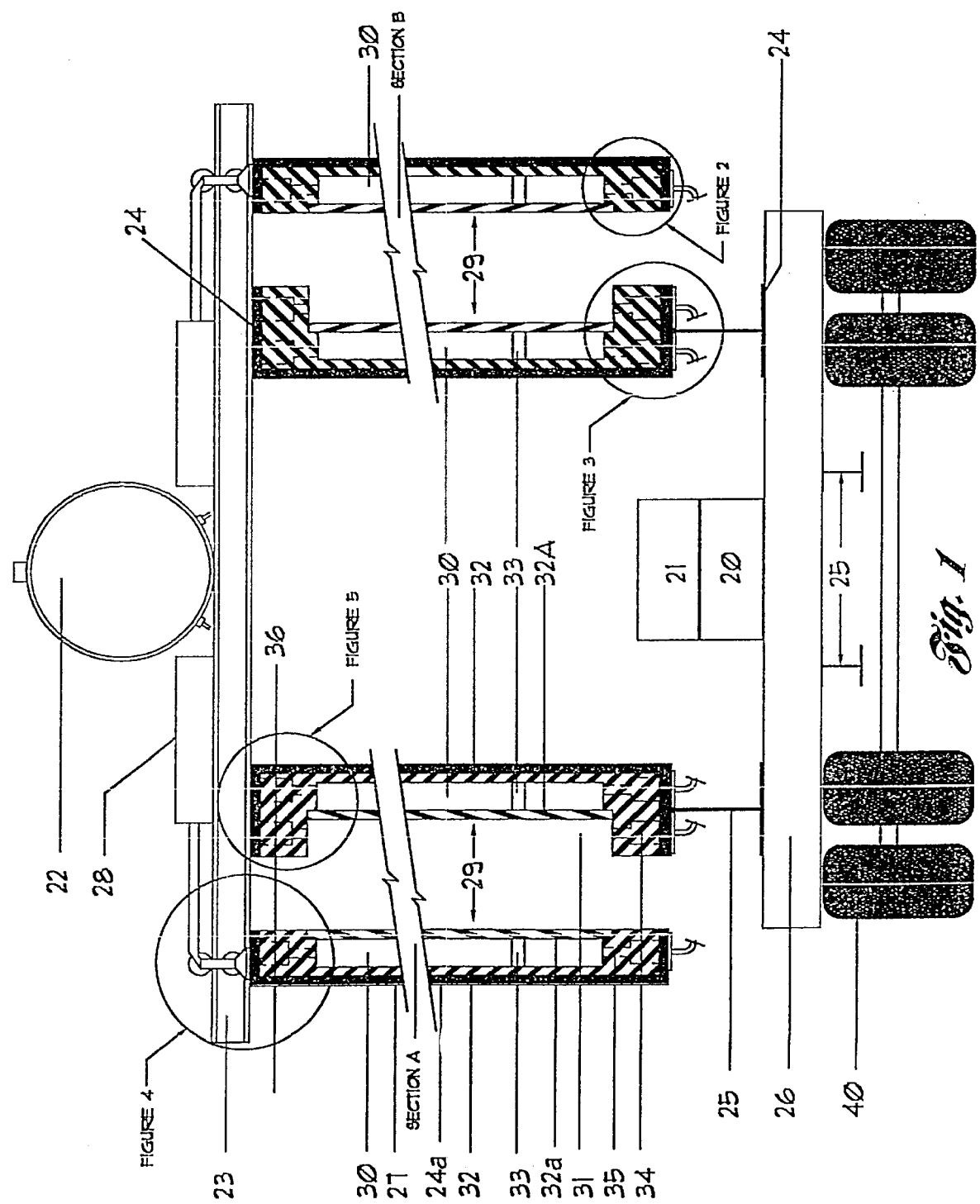
FIG. 1 is an end view of the portable dual injection molds wherein a cross section view of each mirrored mold exposes the internal areas of each mold. This also shows the full end view of the common mobile base and the supporting overhead structural components and supporting equipment.
Figure 2:
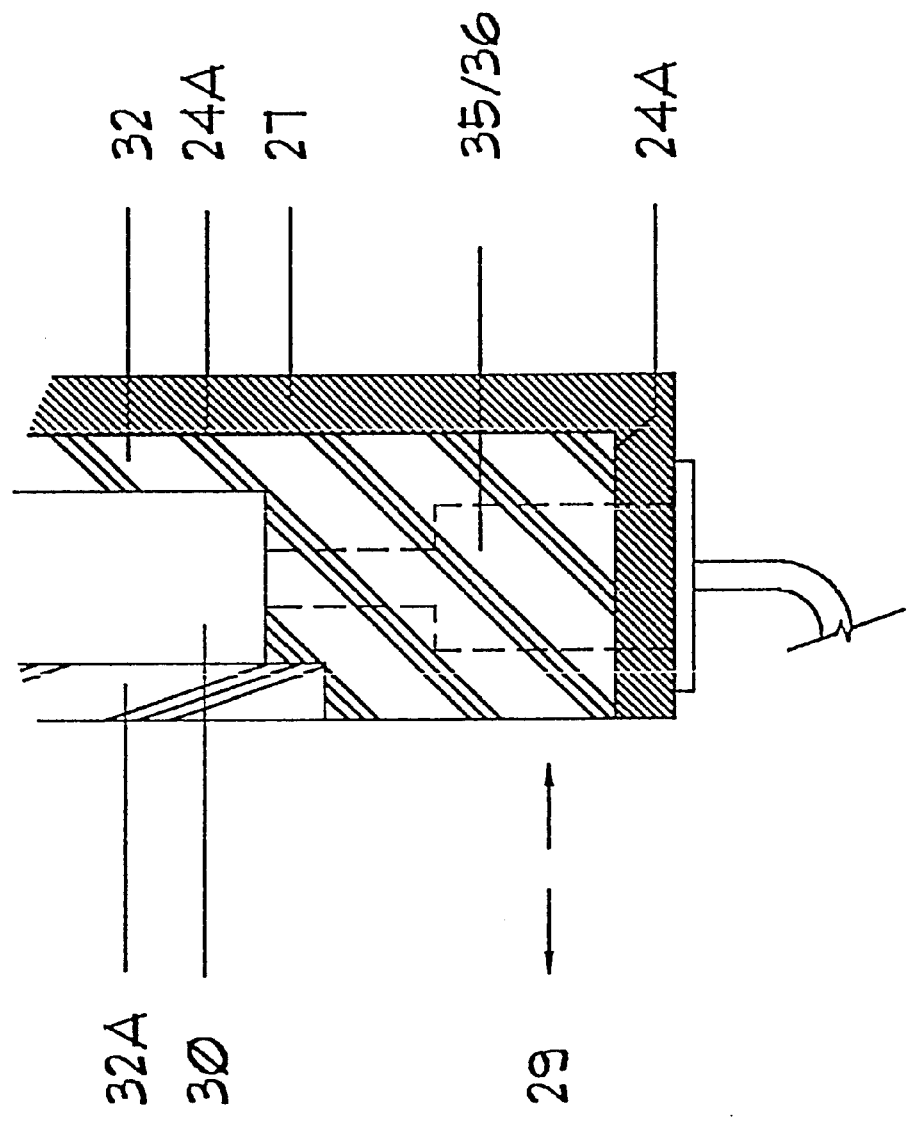
FIG. 2 is a cross section end view of a lower end of a mirrored door assembly for an injection mold.
Figure 3:
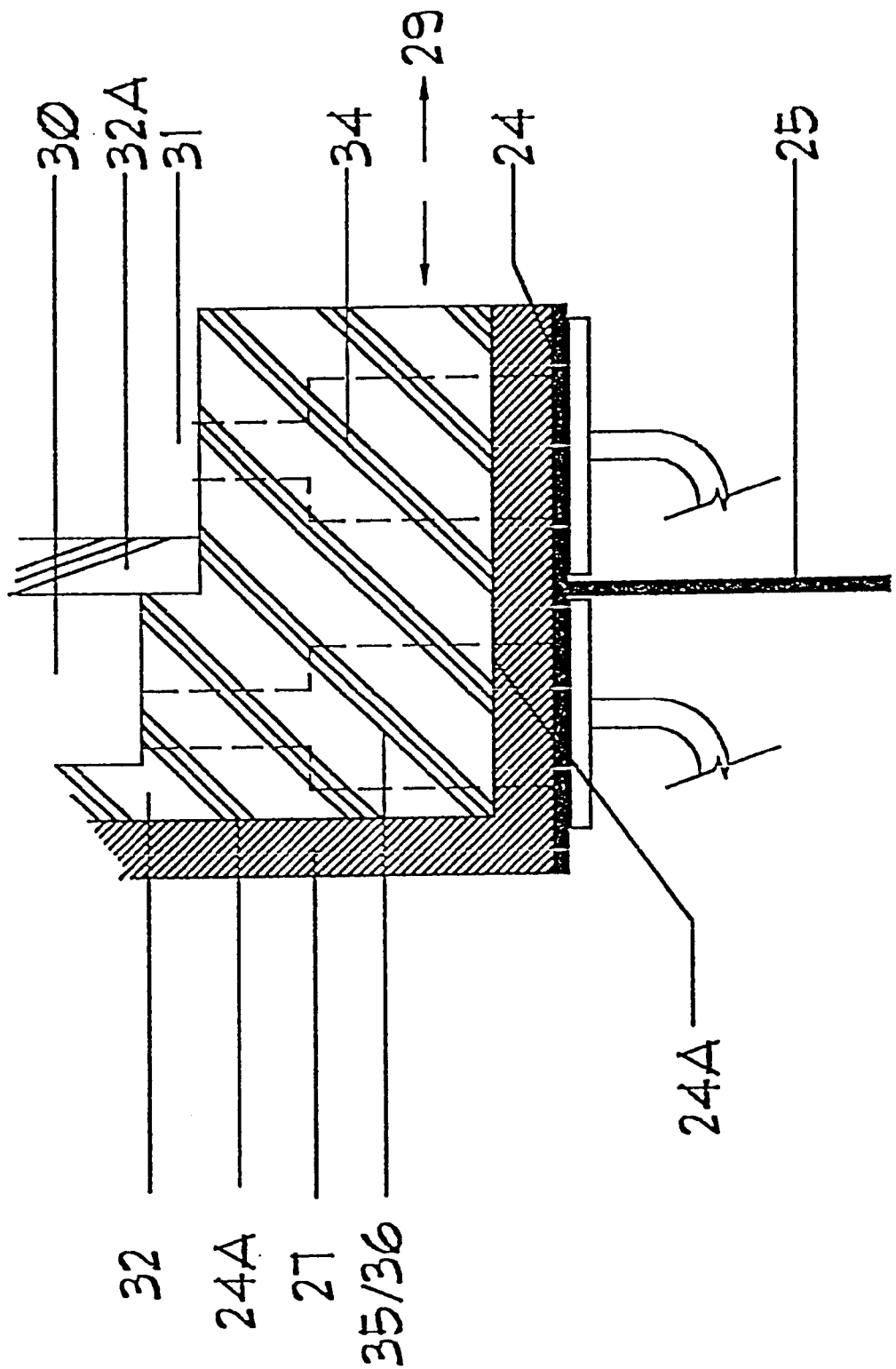
FIG. 3 is a cross section end view of a lower stationary side of a mirrored injection mold.
Figure 4:
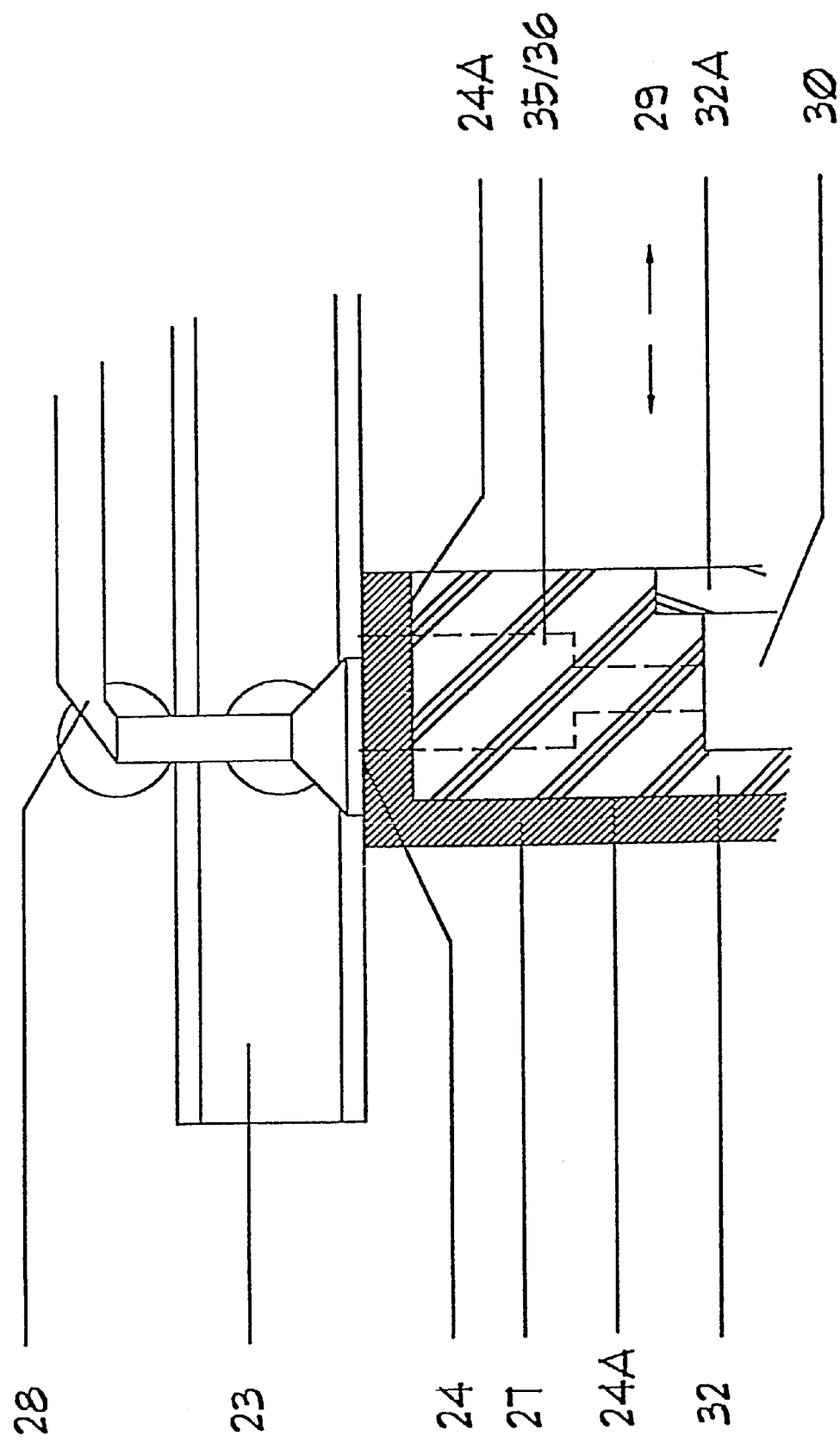
FIG. 4 is a cross section end view of an upper end of a mirrored door assembly for an injection mold with the supporting structural arm and rollers for door travel.
Figure 5:
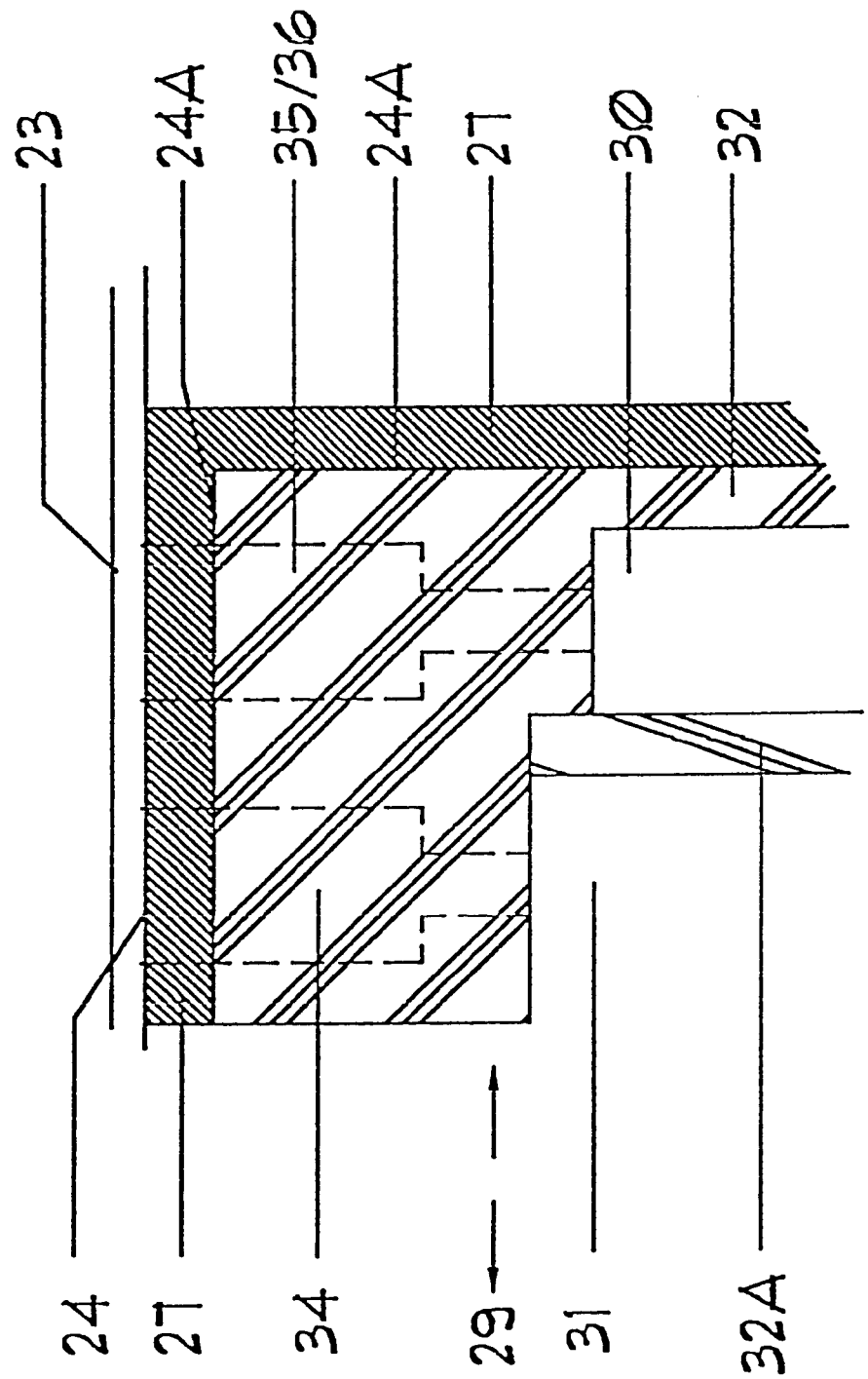
FIG. 5 is a cross section end view of an upper stationary side of the mirrored injection mold with an upper structural brace.
Figure 6:
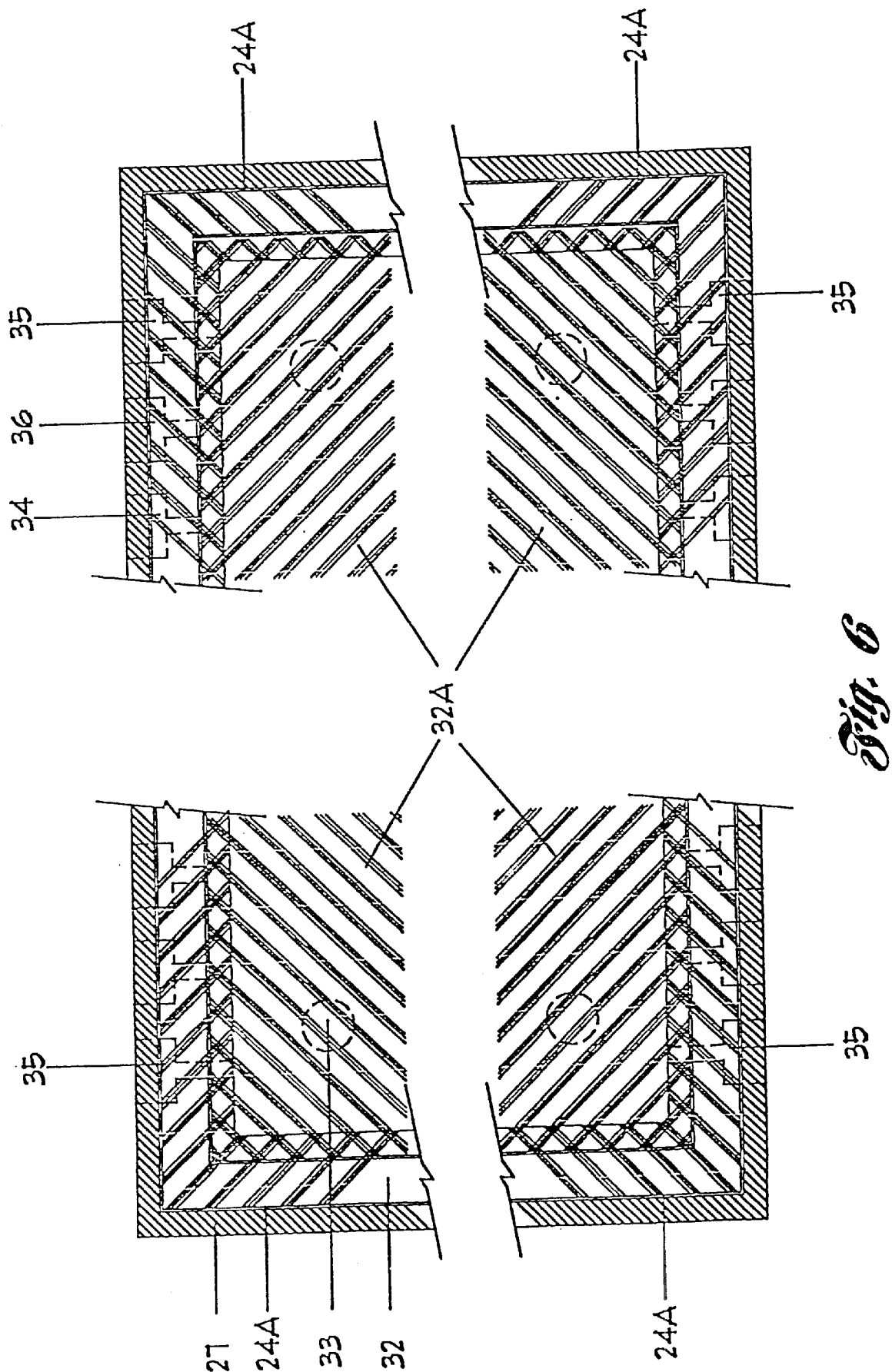
FIG. 6 is a mirrored interior face view of the stationary sides and the door sides of the mirrored injection molds with the partial view of the perforated screen that borders and forms the mold cavity or part chamber.

This invention addresses the issues of light weight/portability, high efficiency and rapid process wherein there are no pre heat or cool down cycles, needless consumption of energy and the time consumed for those cycles while mass producing the structural building panels or blocks while coupled with unlimited size of the production machinery. The dual portable high efficiency rapid process injection molds (FIG. 1) consists of two mirrored press assemblies (Section A) and (Section B). Each section has a stationary side (3) (5) while each also having a movable door side (2) and (4). Both sections are operationally supported by a common material feed hopper (22), hydraulic unit (20) and positive or negative air supply unit (21). The tubular material feed hopper (22) is mounted on at least one common horizontal and perpendicular structural brace or I-Beam (23) which in turn is secured by chemical bond (24) to the top portions of stationary sides (3) and (5) where they contact with each other. Stationary sides (3) and (5) are each in turn secured at the bottoms of their stationary sides to an elevated parallel structural I Beam (25) which runs full congruent length to the stationary sides (3) and (5). The top sides of beams (25) are secured to the bottom of stationary sides (3) (5) of Sections A and B by chemical bonding (24) at the adjacent surfaces located at the bottoms of each stationary side (3) (5) and at the top side surfaces of each structural I Beam support (25). Beam (25) is then secured by chemical bond (24) at the bottom portion of beam (25) where contact is made at all surfaces to the common portable base frame (26) with tire/axle assembly (40). The outer shell surfaces (27) of each press (section A) and (section B) consists of lightweight plate stock made of pultruded fiberglass/resins as is also the structurally shaped beams (25) and perpendicular beams (23). Components of similar light weight composite material (27) (23) (25) and (26) allow for the high strength chemical bonding (24) at any and all adjacent surfaces. The outer shell surfaces (27) of the mirrored movable doors (2) (4) and stationary sides (5) (3) are also constructed from lightweight plate stock of pultruded fiberglass/resins (27). Each movable door (2) and (4) is secured at the top portions by at least one set of rollers and hydraulic cylinder arms (28) for the operation of door travel (29). Each press assembly (section A) (section B) (FIGS. 2, 3, 5 and 4) have at least one steam/heat distribution chamber (30), at least one positive or negative air pressure chamber (30) that serves in both capacities, and at least one mold cavity or part chamber (31). The mold cavity or part chamber (31) and the air and steam distribution chamber (30) are constructed from solid plate stock of Acrylic Polymer, Polycarbonate, Polysulfone, Polyphenylsulfone, polyvinyl or the like and form full perimeters of lightweight, moisture proof, temperature resistant and non corrosive shields (32) (32A) while being supported by at least one post bridge support (33) are all of similar material. Where adjacent outer shell surfaces of pultruded fiberglass/resin plate stock (27) contact dissimilar surfaces of the polyvinyl or the like (32) a chemical bond (24A) is used to maintain structural integrity and dimensional stability. The mold cavity or part chamber (31) is formed and secured on at least one side when the movable door (2) (4) is opened and closed by the roller and hydraulic cylinder arms (28) with the direction of door travel (29). The mold cavity or part chamber (31) has at least two sides of perforated polyvinyl plate stock (32A) with perforations throughout the surface for the even distribution of steam/heat and +/- air pressures supplied to and from distribution chambers (30) for the expansion of the in fill core material contained within the mold cavity or part chamber (31). Part chamber (31) is supplied in fill core material (EPS) by at least one material in fill injector (34) fed from the common material feed hopper (22). The steam/heat distribution chamber (30) and positive or negative air pressure chambers (30), being one in the same, have at least one steam/heat injector valve (35) and at least one positive or negative air pressure valve (36) positioned in the same distribution chamber (30) while operated and fed by a common and corresponding positive or negative air supply unit (21) and a common/corresponding steam boiler unit not shown in this writing. The press/mold assemblies of Sections A and B formed in part at components (30), (31), (32), (32A) and (33) maintain a zero thermal transference and zero moisture absorption. While I have illustrated and described several embodiments of my invention, it will be understood that these are by way of illustration and that variations and changes may be contemplated in my invention within the scope of the following claims.

What I claim is:

1. An apparatus for expansion of polystyrene beads, said apparatus comprising;

a non metallic, non conductive, portable, lightweight, chemical, temperature and moisture resistant mobile base supporting two parallel, mirrored, independent, isolated, lightweight, chemical, temperature and moisture resistant injection molds secured perpendicularly to the structural components of said mobile base, said non metallic and non conductive injection molds having an exterior lightweight, chemical, moisture, and temperature resistant structural material surface sufficient to support internal substrates of structural, lightweight, chemical, moisture and temperature resistant materials forming expansion cavities each sided on two sides by heat and positive or negative air distribution chambers, wherein a structural chemical bonding agent exists at all adjacent points of contact between structural material components of the mobile base, exterior substrate materials and internal substrate material of the mold surfaces.

2. The apparatus of claim 1 wherein said portable mobile base of non metallic, non conductive, lightweight, chemical, moisture and temperature resistant material components consists of pultruded fiberglass.

3. The apparatus of claim 1 wherein said exterior substrates of non metallic, non conductive, lightweight, chemical, moisture and temperature resistant material components consist of pultruded fiberglass.

4. The apparatus of claim 1 wherein said internal substrates of non metallic, non conductive, lightweight, chemical moisture and temperature resistant material components consist of pultruded fiberglass plate or an acrylic polymer.

* * * * *